United States Patent
Dy et al.

(10) Patent No.: US 6,556,733 B2
(45) Date of Patent: Apr. 29, 2003

(54) OPTICAL ISOLATOR AND METHOD FOR MAKING SAME

(75) Inventors: Ja Jn Dy, Tu-Chen (TW); Chun Yu Lee, Tu-Chen (TW); Tai-Cheng Yu, Tu-Chen (TW); Chien-Cheng Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/982,373

(22) Filed: Oct. 17, 2001

(65) Prior Publication Data

US 2003/0007713 A1 Jan. 9, 2003

(30) Foreign Application Priority Data

Jul. 4, 2001 (TW) ..................................... 90211200 U

(51) Int. Cl.[7] ................................................. G02B 6/00
(52) U.S. Cl. .............................. 385/11; 385/15; 385/34; 359/494; 359/495; 359/497
(58) Field of Search ...................... 385/11, 15, 27, 385/34; 359/494, 495, 497

(56) References Cited

U.S. PATENT DOCUMENTS

| | | | | |
|---|---|---|---|---|
| 4,375,910 A | * | 3/1983 | Seki | 350/375 |
| 5,317,655 A | * | 5/1994 | Pan | 385/11 |
| 5,689,360 A | * | 11/1997 | Kurata et al. | 359/281 |
| 5,734,762 A | * | 3/1998 | Ho et al. | 385/11 |
| 5,889,904 A | * | 3/1999 | Pan et al. | 385/24 |
| 6,212,305 B1 | * | 4/2001 | Pan | 385/11 |
| 2002/0159149 A1 | * | 10/2002 | Zhu et al. | 359/484 |

* cited by examiner

Primary Examiner—Akm E. Uliah
Assistant Examiner—Jennifer Doan
(74) Attorney, Agent, or Firm—WeiTe Chung

(57) ABSTRACT

An optical isolator includes a first optical collimator, a first birefringent crystal, a Faraday rotator, a second birefringent crystal and a second optical collimator. The first and second collimators have the same structure and configuration. Each first and second collimator includes a ferrule, an optical fiber retained in the ferrule, and a collimating lens, all of which are secured in a tube. The first and second birefringent crystals are respectively fixed to the first and the second collimators. The Faraday rotator is stationed between the first and second collimators, and fixed onto an end of the first collimator. In assembly, the first and second collimators and the Faraday rotator are all secured in a stainless steel outer tube. The second collimator is rotated within the outer tube until correct relative alignment of optical axes of the birefringent crystals is attained.

14 Claims, 3 Drawing Sheets

OPTICAL ISOLATOR AND METHOD FOR MAKING SAME

BACKGROUND OF THE INVENTION

1. Field of the Invention

The present invention relates to optical isolators, and particularly to optical isolators with birefringent crystals which have optical axes that must have precise relative alignment to yield optimal optical performance.

2. Description of Prior Art

In present-day optical communications technology, optical signals frequently pass through a plurality of optical interfaces. At each interface, reflected signals are generated from the optical signals. If the reflected signals travel back to the signal source through the primary optical route, the source becomes unstable and noisy. Optical isolators are used to block these reflected signals from reaching the source. Ideally, optical isolators transmit all of the light of an optical signal in the forward direction, and block all of the reflected light in the reverse direction.

FIG. 1, illustrates an optical isolator 110 as disclosed in U.S. Pat. No. 5,446,813. The isolator 110 includes a first optical collimator 120, an optical isolated core 130, and a second optical collimator 140. The first optical collimator 120 collimates input optical signals from an input optical fiber 121 into the isolated core 130. The first optical collimator 120 comprises a ferrule 122 retaining the input optical fiber 121 therein, and a graded index (GRIN) lens 123. The ferrule 122 and the GRIN lens 123 are both secured into a tube 124, which in turn is further secured into a stainless steel tube 125. The second optical collimator 140 has a structure which is identical to that of the first optical collimator 120. The second optical collimator 140 is used to collimate optical signals from the isolated core 130 into an output optical fiber 141. The second optical collimator 140 is secured into a stainless steel tube 145. The isolated core 130 comprises a first birefringent crystal 131, a second birefringent crystal 133, and a Faraday rotator 132 stationed between the two crystals 131, 133. The elements of the isolated core 130 are adhered to each other, and then secured into a tube 134. The isolator 110 also has a stainless steel tube 150, with the first and the second optical collimators 120, 140 and the isolated core 130 inserted therein.

In operation, the first birefringent crystal 131 separates incident optical signals into two beams having polarization planes perpendicular to each other. Then the Faraday rotator 132 rotates the two polarized beams a specific angle θ, such as 45 degrees. The second birefringent crystal 133 recombines the two separated beams, and the optical collimator 140 converges the recombined beams into the output optical fiber 141. Because the Faraday rotator 132 is optically nonreciprocal, any returning optical signals from the output optical fiber 141 cannot be converged into the input optical fiber 121. As a result, the isolator 110 ensures one-way signal transmission.

Insertion loss and isolation are the two most important criteria in determining performance of the isolator 110. The most decisive factor regarding isolation is whether the angle between optical axes of the two birefringent crystals 131, 133 is equal to the rotating angle θ by which the Faraday rotator 132 rotates forward singles transmitted therethrough. Furthermore, if the angle between the optical axes is equal to θ, insertion loss of the isolator 110 is decreased.

I t is difficult to control relative positions of the two birefringent crystal 131, 133 during assembly of the isolator 110. Accordingly, it is difficult to control precise adjustment of the angle between the optical axes of the two crystals such that the angle is equal to the rotating angle of the Faraday rotator.

Furthermore, the isolated core 130 of the isolator 110 is formed by adhering the two birefringent crystals 131, 133 and the Faraday rotator 132 together as a unit. Therefore, if the isolated core 130 is found to not meet required optical performance standards, it is necessary to discard the entire isolated core 130.

There is a need for an improved optical isolator which can overcome the disadvantages of the prior art.

SUMMARY OF THE INVENTION

Accordingly, an object of the present invention is to provide an optical isolator which allows easy and precise relative alignment of optical axes of birefringent crystals during assembly of the isolator.

Another object of the present invention is to provide an optical isolator which allows easy and precise readjustment of relative alignment of optical axes of birefringent crystals of the isolator.

To solve the problems of the prior art and achieve the objects set out above, an optical isolator in accordance with a preferred embodiment of the present invention comprises a first optical collimator, a first birefringent crystal, a Faraday rotator, a second birefringent crystal, and a second optical collimator. The first and second collimators have the same structure and configuration. Each first and second collimator comprises a ferrule, an optical fiber retained in the ferrule, and a collimating lens, all of which are secured in a tube. The first and second birefringent crystals are respectively fixed to the first and second collimators. The Faraday rotator is stationed between the first and second collimators, and fixed onto an end of the first collimator. In assembly, the first and second collimators and the Faraday rotator are all secured in a stainless steel outer tube. The second collimator is rotated within the outer tube until correct relative alignment of optical axes of the birefringent crystals is attained.

Other objects, advantages and novel features of the invention will become more apparent from the following detailed description when taken in conjunction with the accompanying drawings.

DETAILED DESCRIPTION OF THE INVENTION

Figure 1:
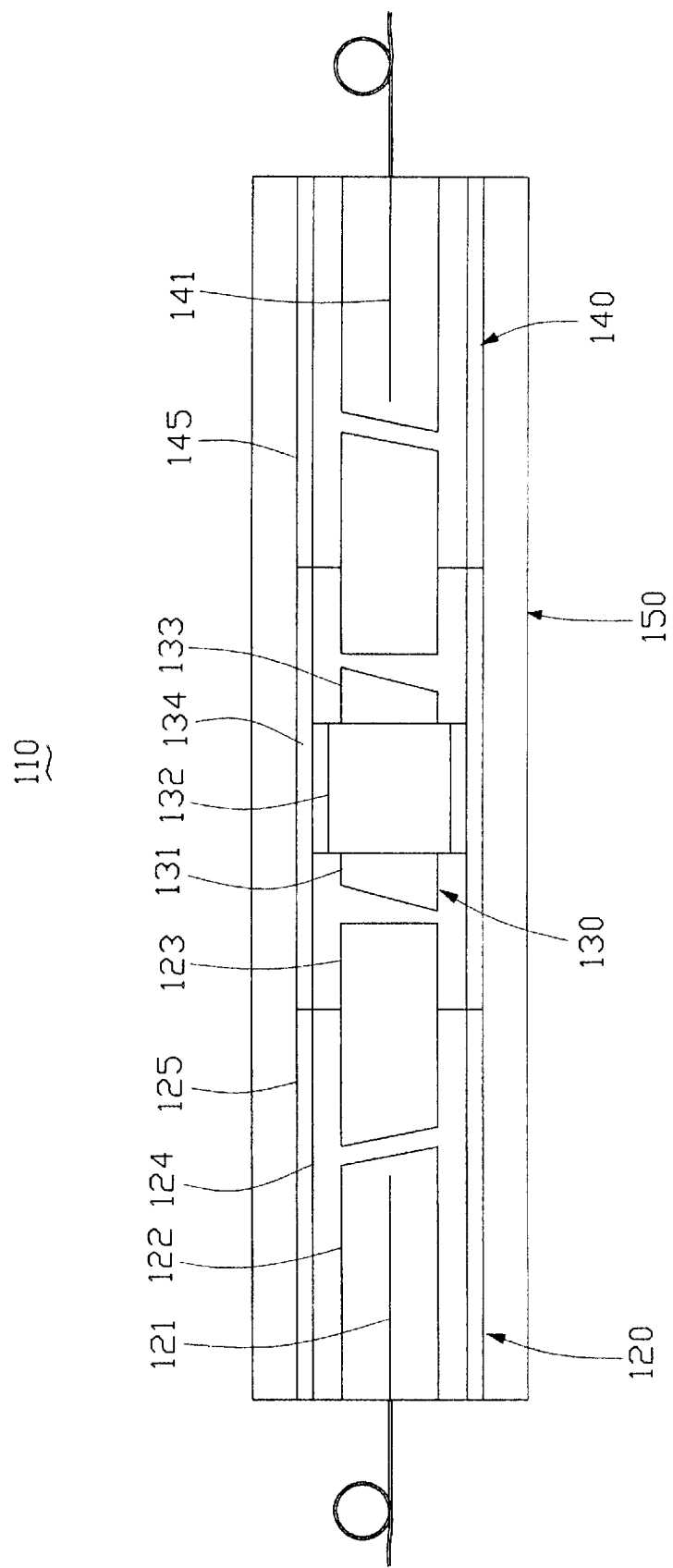
FIG. 1 is a schematic cross-sectional view of a conventional optical isolator.

Reference will now be made to the drawing figures to describe the present invention in detail.

Figure 2:
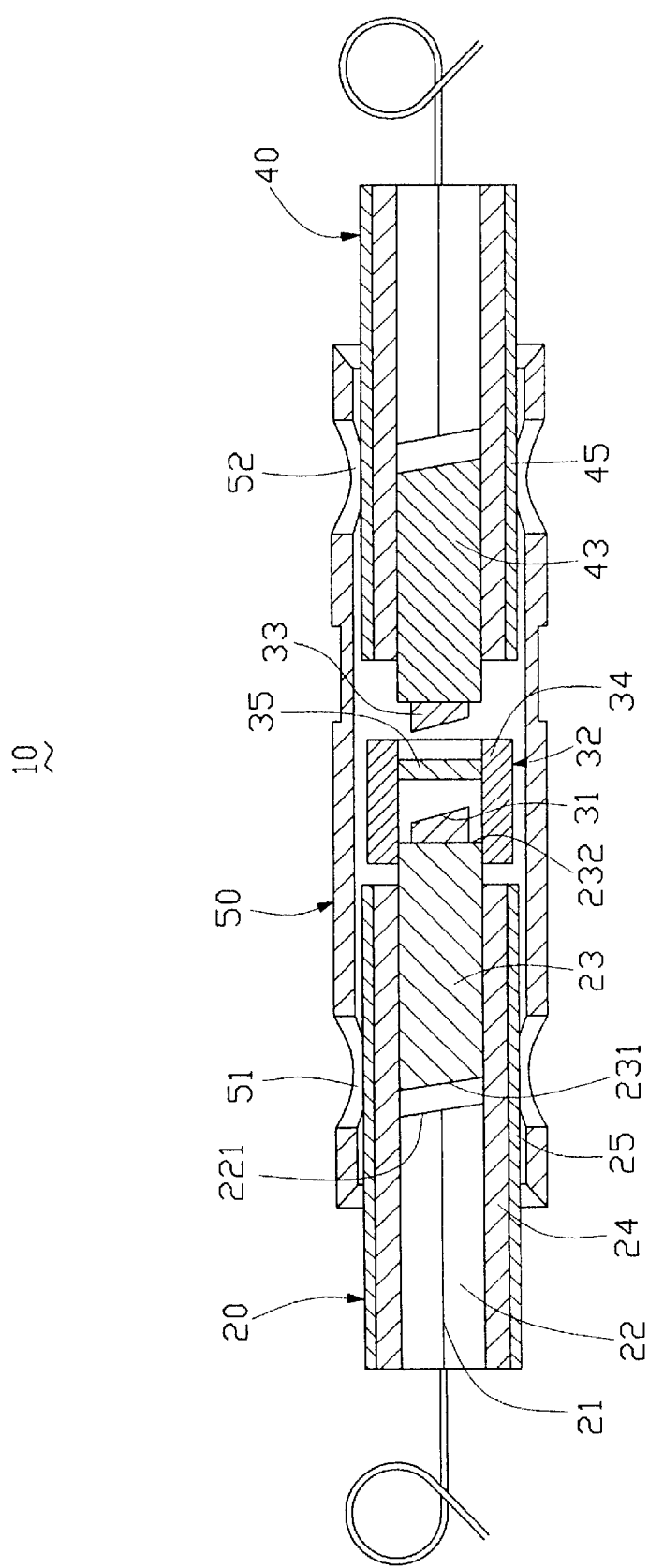
FIG. 2 is a cross-sectional view of an optical isolator in accordance with a preferred embodiment of the present invention.

Referring to FIG. 2, an optical isolator 10 in accordance with a preferred embodiment of the present invention comprises a first optical collimator 20, a first birefringent crystal 31, a Faraday rotator 32, a second birefringent crystal 33, a second optical collimator 40 and a stainless steel outer tube 50.

The first collimator 20 comprises a ferrule 22 with an optical fiber 21 secured therein, a first collimating lens 23, and a first tube 24. The optical fiber 21 has an inner end (not labeled) terminating at a plane defined by an inner end 221 of the ferrule 22 that is adjacent to the first collimating lens 23. The inner end 221 of the ferrule 22 together with the inner end (not labeled) of the fiber 21 is polished such that the inner end 221 forms an angle of eight degrees relative to a plane that is perpendicular to a longitudinal axis of the isolator 10. Then the inner end 221 is coated with a layer of anti-reflective film (not shown) thereon. The first collimating lens 23 is a graded index (GRIN) lens which defines a first end 231 and a second end 232. The first end 231 is adjacent and parallel to the inner end 221 of the ferrule 22. The ferrule 22 and the first collimating lens 23 are all secured within the first tube 24, and the second end 232 of the first collimating lens 23 protrudes a predetermined distance beyond an inner end of the first tube 24. The first tube 24 is made of glass material, and is secured within an outer metallic tube 25.

The second collimator 40 has the same structure and configuration as the first collimator 20. The second collimator 40 includes a second collimating lens 43, and is secured within an outer metallic tube 45.

The first birefringent crystal 31 has a profile of a truncated wedge, and is made of lithium niobate. The first birefringent crystal 31 is adhered firmly to the second end 232 of the first collimating lens 23. The Faraday rotator 32 comprises a magneto-optic crystal 35 and a magnetic ring 34. An end of the magnetic ring 34 encloses a part of the first collimating lens 23 at the second end 232 which protrudes from the first tube 24. The Faraday rotator 32 rotates input optical signals by a predetermined angle, which in the preferred embodiment is 45 degrees. The second birefringent crystal 33 has the same structure as the first birefringent crystal 31, and is adhered firmly to an inner end of the second collimating lens 43.

The stainless steel outer tube 50 defines a plurality of soldering holes 51, 52 in the vicinity of opposite ends thereof respectively. Soldering is applied to the outer metallic tubes 25, 45 and the stainless steel outer tube 50 through the holes 51, 52, to firmly connect the stainless steel outer tube 50 and first and second collimators 20, 40 together.

In assembly, the first collimator 20 having the magnetic ring 34 and the first birefringent crystal 31 is inserted into one end of the stainless steel outer tube 50. The first collimator 20 is secured to the stainless steel outer tube 50 at a predetermined position by soldering the outer metallic tube 25 and the stainless steel outer tube 50 together. The second collimator 40 having the second birefringent crystal 33 is inserted into an opposite end of the stainless steel outer tube 50. The second collimator 40 is then positioned such that the second birefringent crystal 33 is spaced from the magneto-optic crystal 35 a predetermined distance. The second collimator 40 is rotated in the stainless steel outer tube 50 to a position in which an angle between optical axes of the first and second birefringent crystals 31, 33 is equal to the predetermined angle by which the Faraday rotator 32 rotates input optical signals, namely 45 degrees. Then, the outer metallic tube 45 and the stainless steel outer tube 50 are soldered together.

Because the first and second birefringent crystals 31, 33 of the preferred embodiment are respectively adhered firmly to respective ends of the first and second collimators 20, 40, adjustment of the angle between the optical axes of the first and second birefringent crystals 31, 33 during assembly of the optical isolator 10 is easily performed. Accordingly, the optical isolator 10 having high optical performance is easily manufactured. In addition, after assembly, if the relative positions of the first and second birefringent crystals 31, 33 are found to be incorrect, the problem is easily rectified. An operator need only remove a soldering joint of one of the first and second collimators 20, 40, adjust the position of the freed first or second collimator 20, 40, and then resolder the freed first or second collimator 20, 40 and the stainless steel outer tube 50 together again. There is no need to discard any components of the optical isolator 10.

Figure 3:
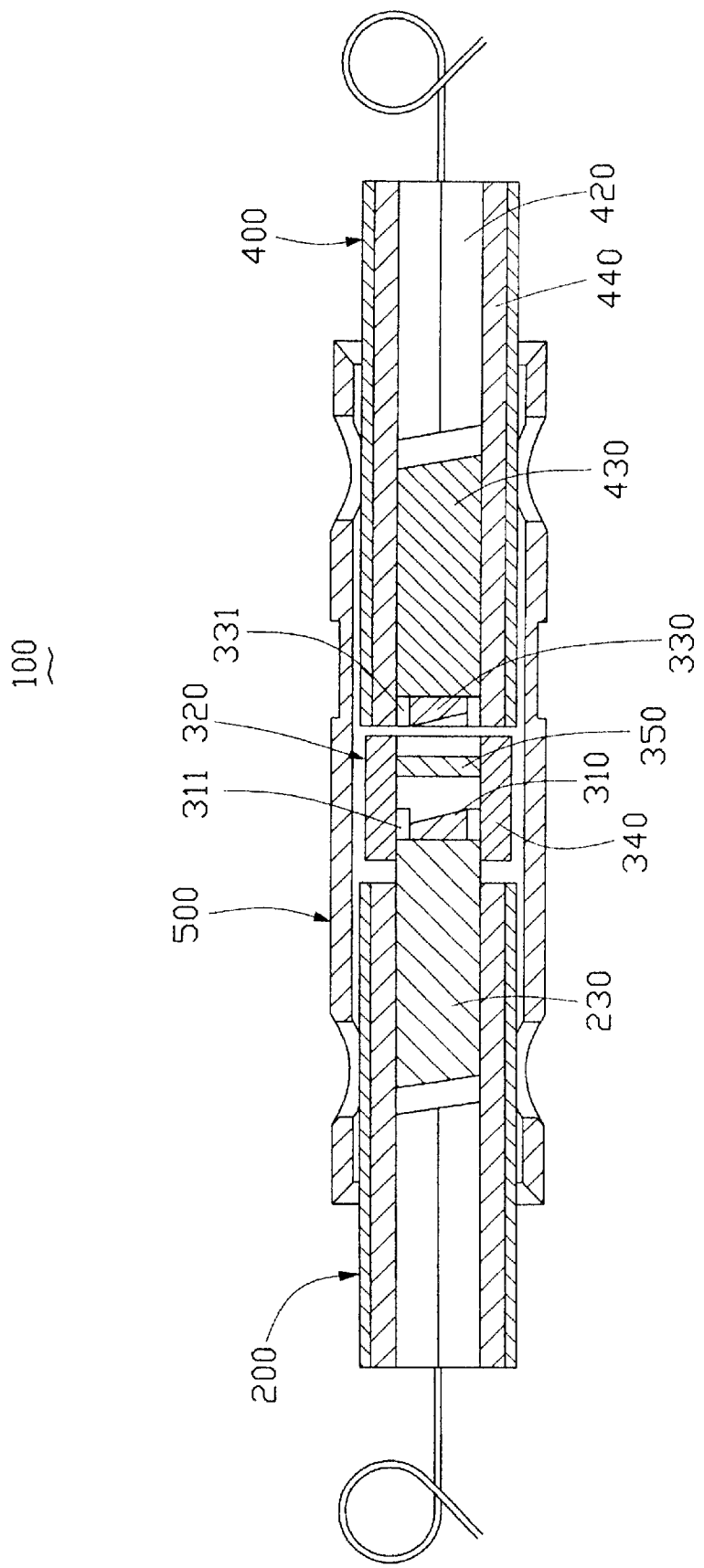
FIG. 3 is a cross-sectional view of an optical isolator in accordance with an alternative embodiment of the present invention.

Turning to FIG. 3, an optical isolator 100 in accordance with an alternative embodiment of the present invention comprises a first optical collimator 200, a first birefringent crystal 310, a Faraday rotator 320, a second birefringent crystal 330, a second optical collimator 400 and a stainless steel outer tube 500. The Faraday rotator 320 comprises a magneto-optic crystal 350 secured within a magnetic ring 340.

The first collimator 200 has a structure identical to that of the first collimator 20 of the optical isolator 10 of the preferred embodiment. The first collimator 200 comprises a first collimating lens 230. The difference between the optical isolator 100 and the optical isolator 10 is that the first birefringent crystal 310 is fixed within a location ring 311, and the location ring 311 is positioned between the first collimating lens 230 and the magneto-optic crystal 350. The location ring 311 is adhered to an inner end of the first collimating lens 230, thereby attaching the first birefringent crystal 310 to the inner end of the first collimating lens 230. In the optical isolator 10 of the preferred embodiment, the first birefringent crystal 31 is directly adhered to the second end 232 of the first collimating lens 23. In the optical isolator 100 of the alternative embodiment, no adhesion is required between the first collimating lens 230 and the first birefringent crystal 310. Therefore, light transmission from the first collimating lens 230 to the first birefringent crystal 310 is improved.

The second collimator 400 has a structure identical to that of the second collimator 40 of the optical isolator 10 of the preferred embodiment. The second collimator 400 comprises a second ferrule 420, a second collimating lens 430, and a second tube 440. The difference between the optical isolator 100 and the optical isolator 10 is that the second tube 440 is longer than a corresponding tube of the optical isolator 10, the second birefringent crystal 330 is secured within a location ring 331, and the location ring 331 is secured within the second tube 440. In the optical isolator 100 of the alternative embodiment, no adhesion is required between the second collimating lens 430 and the second birefringent crystal 330. Therefore, light transmission from the second birefringent crystal 330 to the second collimating lens 430 is improved.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, via rotatably adjusting the relative radial positions between the first collimator and the second collimator, the relative angle between the optic axis of the first birefringent crystal and that of the second birefringent crystal is changed to influence the transmission therebetween so that the device may function as an attenuator.

What is claimed is:

1. An optical isolator comprising:

an outer tube;

a first optical collimator received in the outer tube, the first optical collimator comprising a first ferrule with an optical fiber therewithin and a first collimating lens, the first ferrule and the first collimating lens being secured within a first tube;

a first birefringent crystal attached to an inner end of the first collimating lens;

a second optical collimator received in the outer tube, the second optical collimator comprising a second ferrule with an optical fiber therewithin and a second collimating lens, the second ferrule and the second collimating lens being secured within a second tube;

a second birefringent crystal attached to an inner end of the second collimating lens; and a Faraday rotator received in the outer tube and located between the first and second birefringent crystals.

2. The optical isolator as described in claim 1, wherein the first and second tubes are soldered to the outer tube through holes defined in the outer tube.

3. The optical isolator as described in claim 1, wherein the second collimating lens has an end protruding from the second tube of the second optical collimator.

4. The optical isolator as described in claim 1, wherein the second birefringent crystal is secured within the second tube of the second optical collimator.

5. The optical isolator as described in claim 1, wherein the second birefringent crystal is secured into a location ring which is secured within the second tube of the second optical collimator.

6. The optical isolator as described in claim 1, wherein the first birefringent crystal is secured into a location ring which is adhered onto the inner end of the first collimating lens.

7. The optical isolator as described in claim 6, wherein the Faraday rotator comprises a magneto-optic crystal secured within a magnetic ring which encloses an inner end of the first collimating lens that protrudes from the first tube.

8. The optical isolator as described in claim 1, wherein the first birefringent crystal is secured into a first location ring which is adhered onto the inner end of the first collimating lens, and the second birefringent crystal is secured into a second location ring which is secured within the second tube of the second optical collimator.

9. The optical isolator as described in claim 1, wherein the first collimating lens has an end protruding from the first tube of the first optical collimator.

10. A method for manufacturing an optical isolator, the method comprising:

providing an outer tube;

providing a first optical collimator comprising a first ferrule with an optical fiber therein, and a first collimating lens, the first ferrule and the first collimating lens being secured in a first tube;

attaching a first birefringent crystal to an end of the first collimating lens;

attaching a Faraday rotator to the end of the first collimating lens;

providing a second optical collimator comprising a second ferrule with an optical fiber therein, and a second collimating lens, the second ferrule and the second collimating lens being secured in a second tube;

attaching a second birefringent crystal to an end of the second collimating lens;

inserting the first tube together with the first birefringent crystal and Faraday rotator into a first end of the outer tube to a predetermined position, and fastening the first tube and the outer tube together;

inserting the second tube into a second end of the outer tube to a predetermined position, and rotating the second collimator until an angle between optical axes of the first and second birefringent crystals is equal to an angle by which the Faraday rotator rotates light passing through the Faraday rotator; and fastening the second tube and the outer tube together.

11. The method for manufacturing an optical isolator as described in claim 10, wherein the first and second tubes are soldered to the outer tube through holes defined in the outer tube.

12. The method for manufacturing an optical isolator as described in claim 10, further comprising a step of securing the first birefringent crystal within a location ring which is adhered onto an inner end of the first collimating lens.

13. The method for manufacturing an optical isolator as described in claim 10, further comprising steps of adhering a location ring within the second tube of the second collimator, and securing the second birefringent crystal within the location ring.

14. An optical device comprising:

an outer tube;

opposite first and second collimators received within said outer tube in an axial direction thereof, said first collimator including a first ferrule and a first lens with a first birefringent crystal attached to an end of said first lens, said second collimator including a second ferrule and a second lens with a second birefringent crystal attached to an end of said second lens, said first birefringent crystal defining a first optic axis with an angle relative to a second optic axis defined by said second birefringent crystal;

a Faraday rotator positioned between said first birefringent crystal and said second birefringent crystal with a magnetic ring circumferentially located thereabout; wherein via rotatably adjusting relative radial positions between the first collimator and the second collimator, the relative angle between the first optic axis and the second optic axis can be correspondingly altered, so that the device may be optimized to have lower insertion loss and higher isolation as an isolator, or performs as an attenuator in other applications.

* * * * *